United States Patent
Consonni et al.

(10) Patent No.: US 11,168,847 B2
(45) Date of Patent: Nov. 9, 2021

(54) DIRECTIONAL LIGHTING DEVICE

(71) Applicant: COMMISSARIAT A L'ENERGIE ATOMIQUE ET AUX ENERGIES ALTERNATIVES, Paris (FR)

(72) Inventors: Marianne Consonni, Grenoble (FR); Anis Daami, Grenoble (FR); Frédéric Sermet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/163,742

(22) Filed: Feb. 1, 2021

(65) Prior Publication Data

US 2021/0247033 A1 Aug. 12, 2021

(30) Foreign Application Priority Data

Feb. 10, 2020 (FR) ..................................... 20 01288

(51) Int. Cl.
*F21K 9/65* (2016.01)
*G02B 5/30* (2006.01)
(Continued)

(52) U.S. Cl.
CPC ................. *F21K 9/65* (2016.08); *F21V 9/40* (2018.02); *G02B 5/3016* (2013.01); *F21Y 2115/10* (2016.08)

(58) Field of Classification Search
CPC .......... F21K 9/65; F21K 9/40; G02B 55/3016
(Continued)

(56) References Cited

U.S. PATENT DOCUMENTS 8,236,156 B2 * 8/2012 Sarrut .................... B01D 11/04
  204/450
8,698,180 B2 * 4/2014 Yeh ......................... H01L 33/60
  257/98
(Continued)

FOREIGN PATENT DOCUMENTS

FR 2 590 965 A1 6/1987
FR 2 884 437 A1 10/2006
(Continued)

OTHER PUBLICATIONS

U.S. Appl. No. 16/668,954, filed Oct. 30, 2019, US 2020/0135968 A1, Anis Daami et al.
(Continued)

*Primary Examiner* — Bryon T Gyllstrom
(74) *Attorney, Agent, or Firm* — Oblon, McClelland, Maier & Neustadt, L.L.P.

(57) ABSTRACT

The invention relates to a directional lighting device (10) which comprises:
  a light emission source (30);
  a cover (40) covering the light emission source (30), and provided with an inner wall (41) and an outer wall (42) which delimit an inter-wall space (44), and filled with a fluid, the cover (40) comprising transmission zones (45), each formed of an inner zone (45a) and an outer zone (45b), facing one another, and at which an electric field is capable of being applied to the functional fluid by means of a first electrode (46a) and a second electrode (46b), the functional fluid being adapted to, under the effect of an electric field sensed at a given transmission zone, form with the latter a window transparent to the luminous radiation, and be either opaque or reflective and/or diffusive to said radiation in the remainder of the inter-wall volume (43).

15 Claims, 5 Drawing Sheets

(51) Int. Cl.
*F21V 9/40* (2018.01)
*F21Y 115/10* (2016.01)

(58) Field of Classification Search
USPC .......................................................... 362/555
See application file for complete search history.

(56) References Cited

U.S. PATENT DOCUMENTS

| | | | |
|---|---|---|---|
| 9,004,725 B2* | 4/2015 | Yeh | G02B 26/004 362/318 |
| 10,015,868 B2 | 7/2018 | Quilici et al. | |
| 10,078,160 B2* | 9/2018 | Lee | G02B 26/005 |
| 10,634,899 B2* | 4/2020 | Gopinath | G02B 3/14 |
| 2005/0003107 A1* | 1/2005 | Kumar | C09K 19/2007 428/1.1 |
| 2005/0265024 A1 | 12/2005 | Luk | |
| 2006/0231398 A1 | 10/2006 | Sarrut et al. | |
| 2008/0219004 A1* | 9/2008 | Ronda | F21V 9/40 362/277 |
| 2009/0323330 A1 | 12/2009 | Gordin et al. | |
| 2010/0277923 A1* | 11/2010 | Takai | G02B 3/14 362/296.01 |
| 2020/0166802 A1 | 5/2020 | Fukushima et al. | |

FOREIGN PATENT DOCUMENTS

| | | |
|---|---|---|
| GB | 2 187 567 A | 9/1987 |
| JP | 2008-170632 A | 7/2008 |
| WO | WO 2005/096029 A1 | 10/2005 |
| WO | WO 2006/017129 A2 | 2/2006 |
| WO | WO 2018/216698 A1 | 11/2018 |
| WO | WO 2019/224252 A1 | 11/2019 |

OTHER PUBLICATIONS

U.S. Appl. No. 16/702,664, filed Dec. 4, 2019, US 2020/0185578 A1, Anis Daami et al.
French Preliminary Search Report dated Jun. 23, 2020 in French Application 20 01288 filed Feb. 10, 2020 (with English Translation of Categories of Cited Documents), 2 pages.

\* cited by examiner

DIRECTIONAL LIGHTING DEVICE

TECHNICAL FIELD

The present invention relates to the field of lighting devices and more particularly of directional lighting devices. In this regard, the invention relates to a compact lighting device capable of operating with a single luminous radiation source.

PRIOR ART

Directional lighting devices are now well-known to a person skilled in the art. In the operating principle thereof, these devices make it possible to modify the direction of light emission dynamically, and have, accordingly, growing interest in the implementation thereof in numerous fields. Of the latter, mention can be made of fields such as stage, theatre, monument lighting, but also applications relating to household lighting, public lighting or other more specific applications such as operating theatre lighting can also be considered.

In this regard, document [1] cited at the end of the description discloses a directional lighting device. This device particularly comprises a plurality of light sources arranged on a concave surface (FIG. 6 of document [1]), as well as a cover covering said plurality of light sources (FIG. 8 of document [1]). The cover comprises, for its part, a plurality of openings. In particular, each of the openings thereof is paired with a different light source, such that any luminous radiation capable of being emitted by a given light source passes through the opening with which said source is paired.

This device thus makes it possible to emit a luminous radiation in one or more directions defined by the light source—opening pairs.

However, this device is not satisfactory.

Indeed, the use of a plurality of light sources, and of the power electronics associated with each thereof, renders the device complex to use and control. Moreover, the power electronics, known to be sensitive, are detrimental to the reliability of the directional lighting device.

Furthermore, the individual addressing of each of the light sources requires the use of a relatively complex control card, the cost whereof can be high.

Alternatively, document [2] cited at the end of the description discloses a directional lighting device wherein the adjustment is executed by mechanical means.

In particular, this device comprises at least two plates whereon light-emitting diodes each provided with collimation means rest.

The plates extend radially from an axis of symmetry of a concave base, and are pivotally mounted along one of the edges thereof, or peripheral edge, at the contour of said base. The inclination of each of the plates, adjusted by means of a screw, then makes it possible to set the direction of the luminous radiation emitted by the light-emitting diodes.

However, this device, though robust, remains cumbersome and does not meet the requirements in terms of flexibility of use.

Document [3] cited at the end of the description discloses a further example of a directional lighting device. This device comprises a plurality of light-emitting diodes disposed on a support, and each topped with different beam-shaping optics from one diode to another.

The dynamic modification of the orientation of the light emission is controlled by a selective addressing of the diodes forming the device.

This device remains nonetheless cumbersome and difficult to control.

Thus, an aim of the present invention is that of proposing a directional lighting device for which the control and/or adjustment of the direction of emission of the luminous radiation is simpler to implement compared to devices known from the prior art.

A further aim of the present invention is that of proposing a directional lighting device which has an enhanced robustness compared to devices known from the prior art.

DESCRIPTION OF THE INVENTION

The aims of the invention are, at least in part, achieved by a lighting device intended to illuminate directionally and which comprises:

a light emission source disposed on a support surface;

a double-wall cover disposed covering the light emission source, and provided with an inner wall and an outer wall which delimit a space, or inter-wall space, and entirely filled with a functional fluid, the cover further comprising transmission zones, each formed of an inner zone and an outer zone, respectively, of the inner wall and the outer wall, facing one another, and at which an electric field is capable of being applied to the functional fluid by means of a first electrode and a second electrode, the functional fluid being adapted to, under the effect of an electric field sensed at a given transmission zone, form with the latter a window transparent to the luminous radiation capable of being emitted by the light emission source, and be either opaque or reflective and/or diffusive to said radiation in the remainder of the inter-wall volume, such that said radiation is preferably transmitted by the lighting device through said given transmission zone.

According to an implementation, the cover has a dome shape.

According to an implementation, one and/or the other of the inner zone and the outer zone of each of the transmission zones has a curvature adjusted such that each transmission zone forms, with the functional liquid subject to an electric field at said zone, a collimation lens at the focus whereof the light emission source is disposed.

According to an implementation, the inner wall comprises an inner face facing the light emission source and coated, except for the transmission zones, with a layer of reflective material.

The layer of reflective material can particularly comprise a white paint, for example a fluoropolymer such as Spectralon® supplied by the company Labsphere.

According to an implementation, the support surface is reflective.

According to an implementation, the functional fluid is biphasic which comprises a phase of a first fluid, or ambient phase, and a bubble of a second fluid immiscible with the first fluid, the first fluid being either opaque or reflective and/or diffusive to the luminous radiation capable of being emitted by the source of luminous radiation, whereas the second fluid is transparent to said radiation, the bubble being of a volume substantially equal to the volume of each transmission zone, and the biphasic fluid being configured such that the application of an electric field at one or the other of the two transmission zones called, respectively, first transmission zone and second transmission zone wherein the bubble can be found, generates by electrostatic force a displacement of the bubble from the second transmission zone to the first transmission zone.

According to an implementation, the first electrode and the second electrode are disposed so as to be able to apply an electric field of radial symmetry, such that said field, when it is applied to the ambient phase found in the first transmission zone repels said phase so as to allow the flow of the bubble into said first transmission zone.

According to an implementation, one from the first electrode and the second electrode is disposed to apply a first electrical potential at the center of one from the inner zone and the outer zone, whereas the other electrode is formed to apply a second electric potential on the contour of the other from the inner zone and the outer zone.

According to an implementation, the surfaces of the inner wall and of the outer wall facing one another, have a first surface energy at the transmission zones and a second surface energy, different from the first surface energy, in the other zones, the first surface energy being an energy favouring wetting by the bubble with regard to the ambient phase, and the second surface energy being an energy favouring wetting by the ambient phase with regard to the bubble.

According to an implementation, the respective viscosities of the ambient phase and the bubble are adjusted to enable a displacement of the bubble of fluid from one transmission zone to the other in a time less than a few seconds, for example 5 seconds, or 3 seconds, for an electrical voltage between 5V and 20V.

According to an implementation, the first fluid is an ionic hydrophilic fluid, whereas the second fluid comprises a hydrophobic fluid.

According to this implementation, the bubble can be non-ionic (or non-charged) and hydrophobic. A first hydrophilic and charged fluid thus allows the action of electrostatic forces induced by the action of an electric field. The first fluid can therefore be an aqueous solution. Nevertheless, other hydrophilic liquids, such as alcohols and particularly isopropanol and ethanol, can be considered. The ionic (or charged) solution can be obtained by charging the first fluid with ionic compounds such as magnesium nitrate and/or sodium chloride.

According to an implementation, the functional fluid is a bistable fluid which is either opaque or reflective and/or diffusive to the radiation capable of being emitted by the light emission source, and which becomes transparent to said radiation when it is subjected to an electric field.

According to an implementation, the bistable fluid comprises a nematic type liquid crystal, and more particularly a liquid crystal selected from: MLC-1380000, MLC-1390000, MLC-2139, MLC-2062 or E7.

According to an implementation, the cover comprises a polymer material, and more particularly at least one of the polymers selected from: PMMA, PET, polycarbonate, silicone.

According to an implementation, the light emission source comprises at least one light-emitting diode.

BRIEF DESCRIPTION OF THE DRAWINGS

Further features and advantages will emerge in the following description of a directional lighting device according to the invention, given by way of non-limiting examples, with reference to the appended drawings wherein.

DETAILED DESCRIPTION OF SPECIFIC EMBODIMENTS

The present invention relates to a directional lighting device, and particularly provided with a so-called smart lens. In particular, the device according to the present invention comprises a light emission source covering which a double-wall cover provided with an inner wall and an outer wall delimiting an inter-wall space entirely filled with a functional fluid is disposed.

The cover further comprises transmission zones, each formed of an inner zone and an outer zone, respectively, of the inner wall and the outer wall, facing one another, and at which an electric field is capable of being applied to the functional fluid.

Finally, according to the present invention, the functional fluid is adapted to, under the effect of an electric field sensed at a given transmission zone, form with the latter a window transparent to the luminous radiation capable of being emitted by the light emission source, and be either opaque or reflective and/or diffusive to said radiation in the remainder of the inter-wall volume, such that said radiation is preferably transmitted by the lighting device through said given transmission zone.

The term "opaque" denotes a fluid which absorbs at least 90%, preferably 100%, of the radiation capable of being emitted by the luminous radiation source.

The term "reflective" denotes a fluid which reflects at least 80%, preferably 95%, of the radiation capable of being emitted by the luminous radiation source.

The term "transparent" denotes a fluid or a material which allows at least 50%, preferably 70% or 80%, of the radiation capable of being emitted by the luminous radiation source through.

Figure 1:
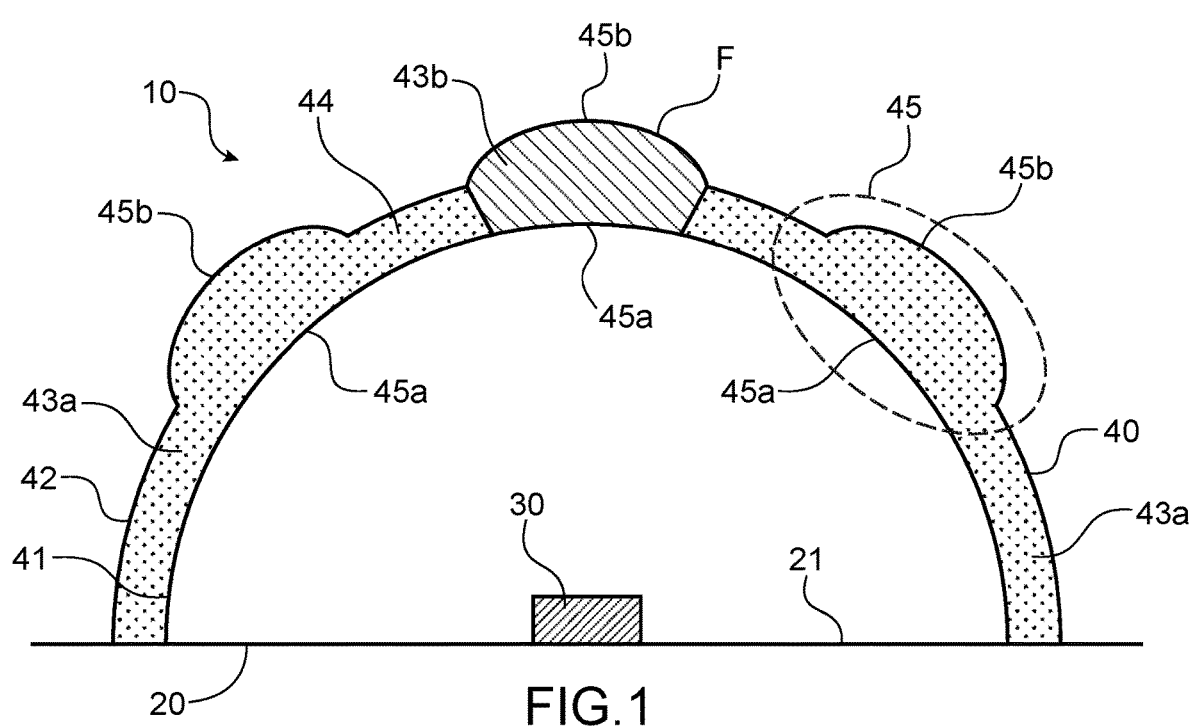
FIG. 1 is a schematic representation along a cutting plane of a device according to a first embodiment of the present invention, the cutting plane comprising the axis of revolution of the dome-shaped cover.

In FIG. 1, an illustration of a directional lighting device 10 according to a first embodiment of the present invention can be seen.

The directional lighting device 10 according to the present invention comprises a support 20 on a surface whereof, or support surface 21, a light emission source 30 rests.

The support 20 can comprise supply means intended to control the emission of a luminous radiation by the light emission source 30. The latter can in this regard comprise a light-emitting diode (LED).

Particularly advantageously, the light emission source 30 can be a Lambertian source.

The light emission source 30 can be adapted to emit a luminous radiation in the visible range, and particularly within a range of wavelengths between 400 nm and 700 nm.

The directional lighting device 10 also comprises a double-wall cover 40 covering the light emission source 30. The term "covering" denotes a cover wherein the edge rests on the support surface 21 so as to form with the latter a volume wherein the light emission source 30 is disposed.

The cover 40 can take the shape of a dome. The invention is however not limited solely to this shape, and it can be intended to give the latter a rectangular or conical, or even frustoconical, shape.

The double-wall cover 40 further comprises an inner wall 41 and an outer wall 42 for example interconnected at the edge of said cover 40, and delimiting a space or inter-wall space 44 entirely filled with a functional fluid.

The dimensions of the inner and outer walls, of the inter-wall space 44, and more generally of the cover 40, are dependent on the target application and the size of the light emission source 30. A person skilled in the art will therefore be able to adjust the latter in order to better respond to the requirements applied thereto.

The inner wall 41 and the outer wall 42 can comprise a polymer material transparent to the luminous radiation capable of being emitted by the light emission source 30.

The polymer material can for example comprise at least one of the materials selected from: PMMA, PET, polycarbonate, silicone.

The cover 40 also comprises zones, or transmission zones 45, formed of an inner zone 45a and an outer zone 45b, respectively, of the inner wall 41 and the outer wall 42, and facing one another.

Figure 2A:
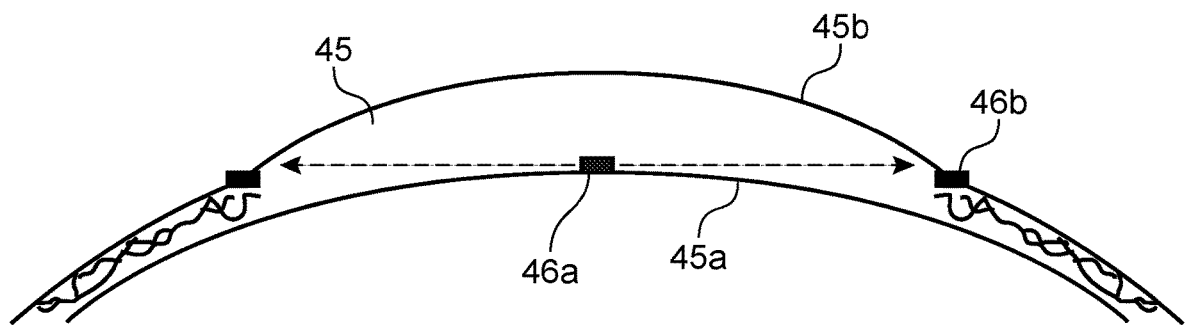
FIG. 2A is a schematic representation of the first and the second electrode disposed at a transmission zone of the device represented in FIG. 1 and along a cutting plane comprising the axis of revolution of the disk-shaped transmission zone, the dotted-line arrows representing the electric field lines generated by said electrodes.
Figure 2B:
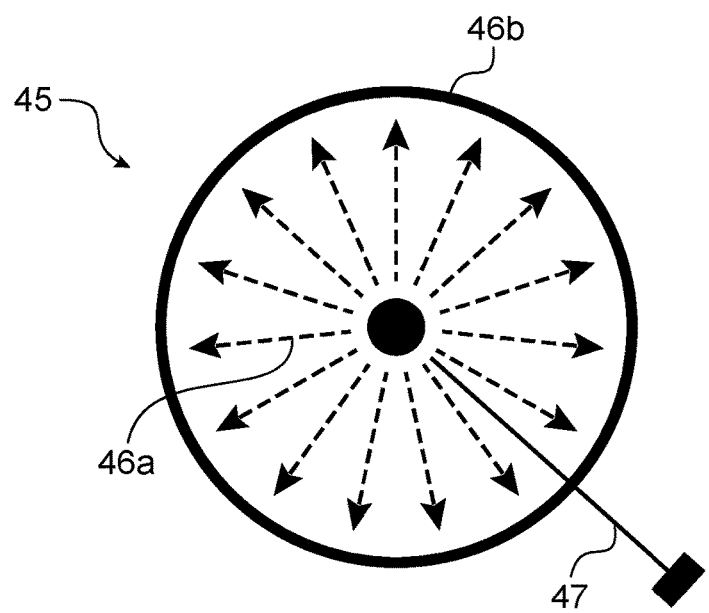
FIG. 2B is a schematic representation of the first and the second electrode disposed at a transmission zone of the device represented in FIG. 1, and according to a view plumb with the outer zone of said transmission zone, the dotted-line arrows representing the electric field lines generated by said electrodes.

More particularly, the inner zone 45a and the outer zone 45b of each of the transmission zones 45 are zones at which an electric field is capable of being applied to the functional fluid disposed between said zones by means of a first electrode 46a and a second electrode 46b (FIGS. 2A and 2B).

The inner zone 45a and the outer zone 45b are preferably disk-shaped. However, other shapes, and particularly rectangular, square, triangular, and elliptical shapes can be considered within the scope of the present invention.

Also, according to the present invention, the functional fluid is adapted to, under the effect of said electric field sensed at a given transmission zone, form with the latter a window F transparent to the luminous radiation capable of being emitted by the light emission source, and be either opaque or reflective and/or diffusive to said radiation in the remainder of the inter-wall volume, such that said radiation is preferentially transmitted by the lighting device through said given transmission zone.

According to this first embodiment, the functional fluid is a biphasic fluid. In particular, the biphasic fluid comprises a phase, or ambient phase 43a, of a first fluid and a bubble 43b of a second fluid immiscible with the first fluid. More particularly, the first fluid is either opaque or reflective and/or diffusive to the luminous radiation capable of being emitted by the luminous radiation source 30, whereas the second fluid is transparent to said radiation. Moreover, the bubble 43b is of a volume substantially equal to the volume of each transmission zone.

Finally, the biphasic fluid is configured so that the application of an electric field at one or the other of two transmission zones called, respectively, first transmission zone and second transmission zone wherein the bubble can be found, generates a displacement of the bubble from the second transmission zone to the first transmission zone.

The displacement of the bubble can, for example involve an expulsion of the first fluid from the first transmission zone under the effect of an electric field applied at said zone, and a replacement of said fluid by the bubble by flow of the latter from the second transmission to the first transmission zone. Preferably, one and/or the other of the first fluid and the second fluid is incompressible or poorly compressible. An electric action on the bubble rather than on the ambient phase can, alternatively, be considered.

Figure 3A:
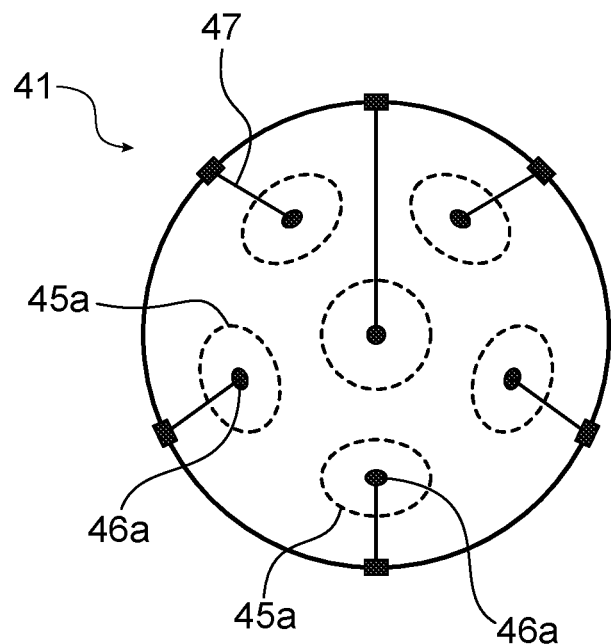
FIG. 3A is a schematic representation of the inner wall of the cover of the device represented in FIG. 1, and according to a view plumb with said wall.
Figure 3B:
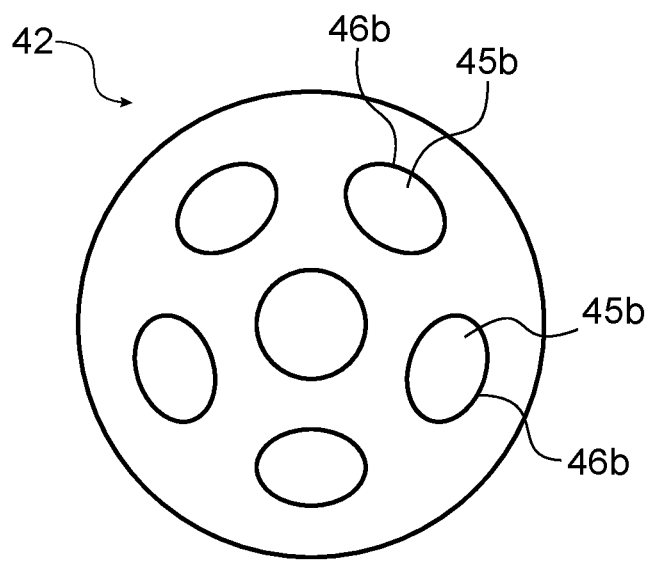
FIG. 3B is a schematic representation of the outer wall of the cover of the device represented in FIG. 1, and according to a view plumb with said wall.

The electric field intended to expel the first fluid can be of radial symmetry. More particularly, for each transmission zone 45, as illustrated in FIGS. 2A and 2B, one from the first electrode 46a and the second electrode 46b is disposed to apply a first electrical potential at the center of one from the inner zone and the outer zone, whereas the other electrode is formed to apply a second electric potential on the contour of the other from the inner zone and the outer zone. For each transmission zone, the first electrode 46a can for example comprise a metallic contact disposed at the center of the inner zone 45a (FIGS. 2A and 3A), whereas the second electrode 46b can comprise a metallic contact formed on the entire contour of the outer zone 45b of each transmission zone 45 (FIGS. 2B and 3B). A metallic track 47 for addressing the first electrode can extend radially on the surface of the inner zone 45a.

The second electrodes 46b can be electrically connected together, and accordingly, apply the same potential to each of the contours of the outer zones. The first electrodes 46a are in this scenario isolated from one another, and each addressed individually.

The metallic tracks and the electrodes can comprise copper.

The directional lighting device can be connected to control means, for example an electronic control card, for addressing each of the electrodes.

According to a first alternative embodiment of this first embodiment, the first fluid capable of being expelled from a transmission zone 45 under the effect of an electric field comprises for example a conductive fluid, whereas the second fluid can be non-conductive.

The first fluid can comprise an aqueous and/or ionic hydrophilic fluid, whereas the second fluid can be an organic fluid, for example an oil and more particularly a silicone, and more generally a hydrocarbon.

The bubble (the second fluid) can be non-ionic (or non-charged) and hydrophobic. A first hydrophilic and charged fluid thus allows the action of electrostatic forces induced by the action of an electric field. The first fluid can therefore be an aqueous solution. Nevertheless, other hydrophilic liquids, such as alcohols and particularly isopropanol and ethanol, can be considered. The ionic (or charged) solution can be obtained by charging the first fluid with ionic compounds such as magnesium nitrate and/or sodium chloride.

Advantageously, the first fluid can comprise particles for example white particles ($TiO_2$ or ZnO) acting as reflective particles. The second fluid can also comprise particles, and particularly nanoparticles ($TiO_2$, $ZrO_2$, ZnS, PbS, etc.) intended to increase the effective index of said fluid. The latter aspect, as described hereinafter in the description, will be particularly advantageous if the transmission zone is to form a collimation lens with the bubble.

According to a second alternative embodiment of this first embodiment, the first fluid and the second fluid are both non-conductive, and the first fluid has substantially greater polarisability than that of the second fluid.

The first and the second alternative embodiment implement an electrowetting and dielectrophoresis effect, respectively, described on page 11 and 12 of document [4] cited at the end of the description.

Advantageously, and within the scope of the first embodiment, the surfaces of the inner wall 41 and the outer wall 42 facing one another, have a first surface energy at the transmission zones 45 and a second surface energy, different from the first surface energy, in the other zones. More particularly, the first surface energy is an energy favouring wetting by the bubble with regard to the ambient phase, and the second surface energy is an energy favouring wetting by the ambient phase with regard to the bubble. The choice of coatings for adjusting the surface energies is within the grasp of a person skilled in the art and is therefore not described in the present application. It is however possible to use FDTS (perfluorodecyltrichlorosilane) and SiOC, both hydrophobic compounds.

Still advantageously, the respective viscosities of the ambient phase and the bubble are adjusted to enable a displacement of the bubble of fluid from one transmission zone to the other in a time less than a few seconds, for example 5 seconds, or 3 seconds, for an electrical voltage between 5V and 20V.

The invention also relates to a second embodiment which differs from the first embodiment in that the functional fluid is a bistable fluid, for example a liquid crystal, which is either opaque or reflective and/or diffusive to the radiation capable of being emitted by the light emission source, and which becomes transparent to said radiation when it is subjected to an electric field.

Figure 4:
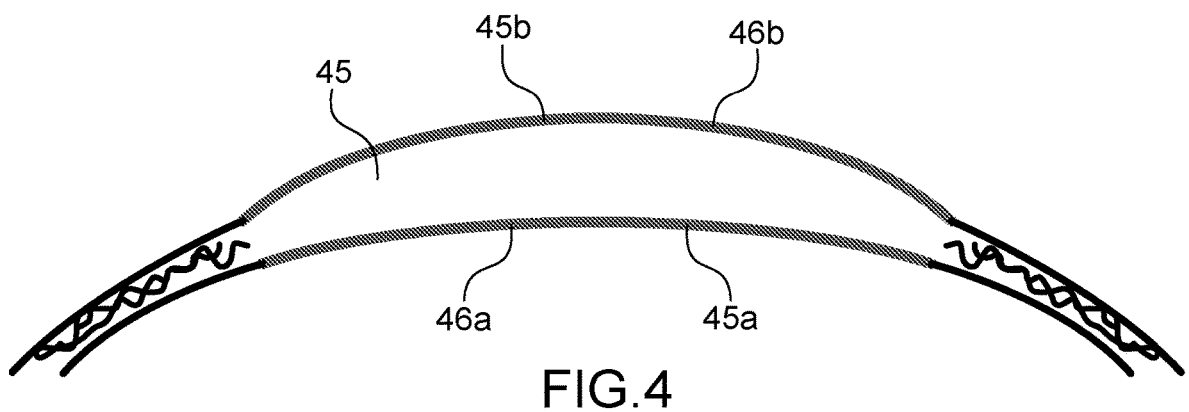
FIG. 4 is a schematic representation of a transmission zone along a cutting plane according to a second embodiment of the present invention.

The liquid crystal is configured to be transparent when an electric field polarising it is applied thereto and remain opaque otherwise (FIG. 4).

In this regard, the device comprises, at each of the transmission zones, two optically intersecting polarisers covering, respectively, an inner zone and an outer zone.

The first electrode 46a and the second electrode 46b of each of the transmission zones are, for their part, formed, according to this second embodiment, each covering a polariser. These polarisers, when they apply an electric field in a given transmission zone, modify the orientation of the liquid crystal filling said transmission zone, and render said crystal transparent.

The liquid crystal can comprise at least one of the following compounds selected from nematic type liquid crystals: MLC-1380000, MLC-1390000, MLC-2139, MLC-2062 or E7.

The electrodes of a given transmission zone are particularly each fully covering, respectively, the outer zone and the inner zone. In this regard, the electrodes can comprise a conductive transparent oxide, for example indium titanium oxide (ITO).

The use of a liquid crystal makes it possible to switch from a non-transparent state ("opaque" or "reflective") to a transparent state in a relatively short time interval and particularly less than 20 milliseconds.

Regardless of the embodiment considered, one and/or the other of the inner zone and the outer zone of each of the transmission zones has a curvature adjusted such that each transmission zone forms, with the functional liquid subject to an electric field at said zone, a collimation lens at the focus whereof the light emission source is disposed.

The inventors simulated the efficiency of such a lens on the extraction capacity of the luminous radiation capable of being emitted by the light emission source. A cover in question is rigid, hemispherical, of internal diameter of 12 cm. The latter also comprises 6 separate transmission zones of diameter 4.8 cm and of radius of curvature 5 cm. The cover rests moreover on a diffusive and reflective support surface whereon a luminous radiation source is disposed.

Figure 5A:
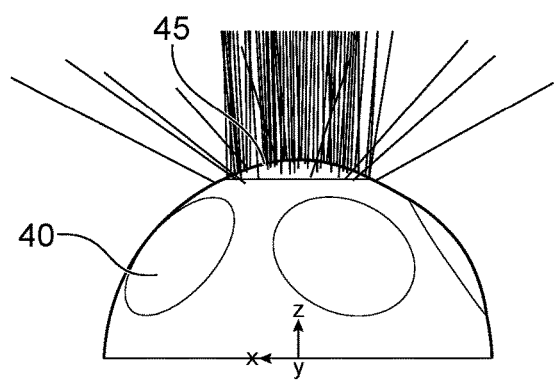
FIG. 5A is a schematic representation of the radiation extracted at a transmission zone plumb with the luminous radiation source.
Figure 5B:
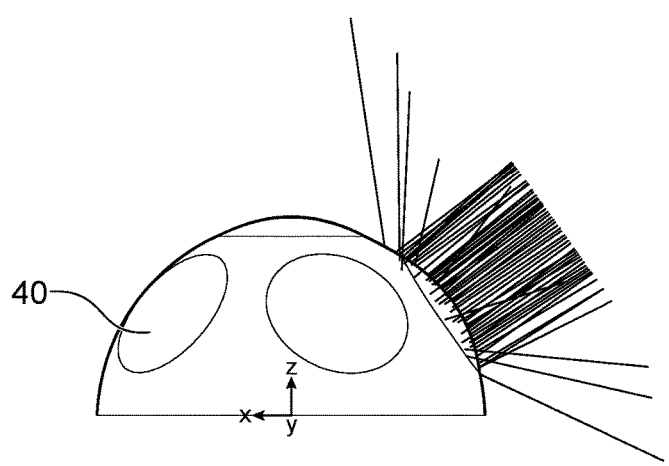
FIG. 5B is a schematic representation of the radiation extracted at a transmission zone offset laterally with respect to the luminous radiation source.

The functional fluid in question is biphasic and comprises a bubble made of a second liquid of refractive liquid n=1.64. FIGS. 5A and 5B represent the radiation emitted by the light emission source and actually extracted at the two different transmission zones.

The tracings thus obtained by simulation (particularly with "Light Tools" software) of the light extraction actually obtained at the transparent zone wherein the bubble is housed are illustrated in FIGS. 5A and 5B. The angular dispersion of the radiation extracted is very narrow and particularly less than 10°.

Still advantageously, the inner wall comprises an inner face facing the light emission source and coated, except for the transmission zones, with a layer of reflective material. The layer of reflective material can particularly comprise a white paint, for example a fluoropolymer such as Spectralon® supplied by the company Labsphere.

The support surface can also be reflective.

Figure 6:
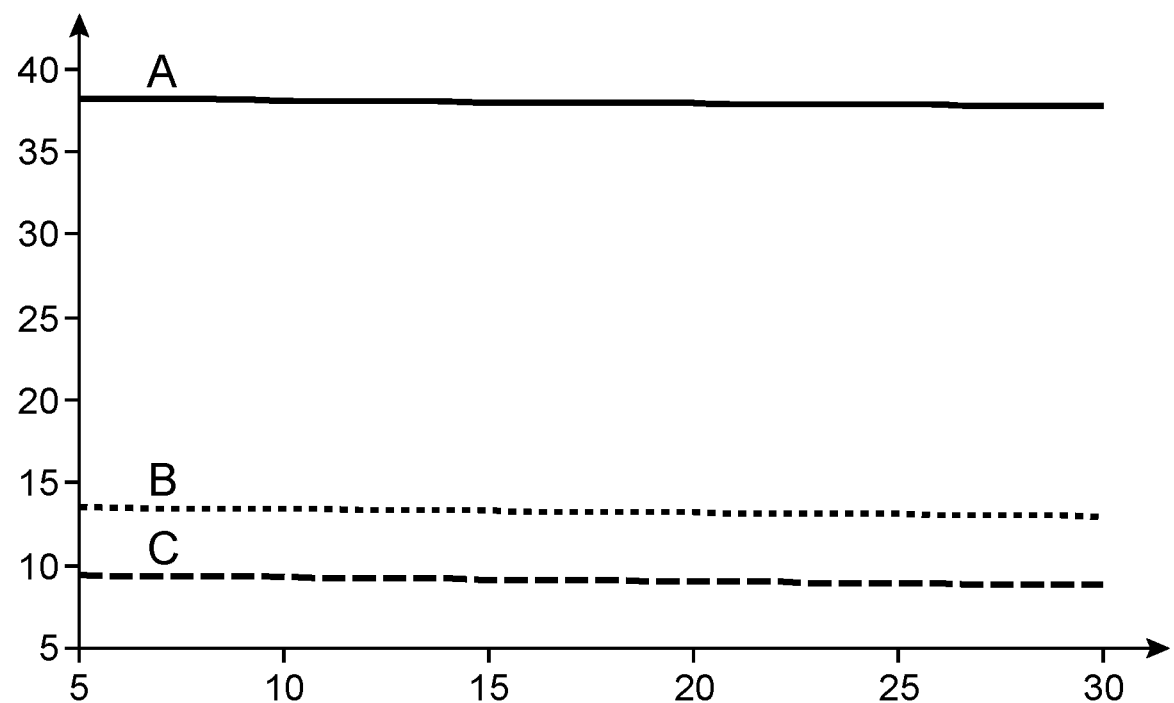
FIG. 6 is a graphic representation of the light extraction (as a percentage along the vertical axis) according to the size of the luminous radiation source (in mm along the horizontal axis), the curve "A" represents the extraction for a reflective cover and ambient phase, the curve "B" represents the extraction for a reflective curve and an absorbent ambient phase, and the curve "C" represents the extraction of an absorbent cover and ambient phase.

In this regard, FIG. 6 is a graphic representation of the light extraction (as a percentage along the vertical axis) as a function of the size of the light emission source (in mm along the horizontal axis). More particularly, the curve "A" represents the extraction for a reflective cover and ambient phase, the curve "B" represents the extraction for a reflective curve and an absorbent ambient phase, and the curve "C" represents the extraction of an absorbent cover and ambient phase.

Reading this graph shows that the size of the light emission source has merely a slight effect on the light extraction, whereas the reflective property both of the cover and the ambient phase makes it possible to enhance the extraction.

The directional lighting device proposed in the present invention is perfectly homothetic, and therefore makes it possible to consider devices of all sizes within the limits of validity of geometrical optics.

The device can moreover be considered in the fields of lighting but can also be used in large-size screens. The latter can also be integrated for 3D screens.

REFERENCES

[1] U.S. Ser. No. 10/015,868B2;
[2] US 2005/0265024;
[3] US 2009/0323330;

The invention claimed is:

1. A Directional lighting device which comprises:
a light emission source disposed on a support surface;
a double-wall cover disposed covering the light emission source, and provided with an inner wall and an outer wall which delimit a space, or inter-wall space, and entirely filled with a functional fluid, the cover further comprising transmission zones, each formed of an inner zone and an outer zone, respectively, of the inner wall and the outer wall, facing one another, and at which an electric field is capable of being applied to the functional fluid by means of a first electrode and a second electrode, the functional fluid being adapted to, under the effect of an electric field sensed at a given transmission zone, form with the latter a window transparent to luminous radiation capable of being emitted by the light emission source, and be either opaque or reflective and/or diffusive to said radiation in a remainder of the inter-wall space, such that said radiation is preferably transmitted by the lighting device through said given transmission zone.

2. The device according to claim 1, wherein the cover has a dome shape.

3. The device according to claim 2, wherein one and/or the other of the inner zone and the outer zone of each of the transmission zones has a curvature adjusted such that each transmission zone forms, with the functional liquid subject to an electric field at said zone, a collimation lens at the focus whereof the light emission source is disposed.

4. The device according to claim 2, wherein the inner wall comprises an inner face facing the light emission source and coated, except for the transmission zones, with a layer of reflective material.

5. The device according to claim 2, wherein the support surface is reflective.

6. The device according to claim 2, wherein the functional fluid is biphasic which comprises a phase of a first fluid, or ambient phase, and a bubble of a second fluid immiscible with the first fluid, the first fluid being either opaque or reflective and/or diffusive to the luminous radiation capable of being emitted by the source of luminous radiation, whereas the second fluid is transparent to said radiation, the bubble being of a volume substantially equal to the volume of each transmission zone, and the biphasic fluid being configured such that the application of an electric field at one or the other of the two transmission zones called, respectively, first transmission zone and second transmission zone wherein the bubble can be found, generates by electrostatic force a displacement of the bubble from the second transmission zone to the first transmission zone.

7. The device according to claim 6, wherein the first electrode and the second electrode are disposed so as to be able to apply an electric field of radial symmetry, such that said field, when it is applied to the ambient phase found in the first transmission zone repels said phase so as to allow the flow of the bubble into said first transmission zone.

8. The device according to claim 7, wherein one from the first electrode and the second electrode is disposed to apply a first electrical potential at the center of one of the inner zone and the outer zone, whereas the other electrode is formed to apply a second electric potential on the contour of the other of the inner zone and the outer zone.

9. The device according to claim 6, wherein the surfaces of the inner wall and of the outer wall facing one another, have a first surface energy at the transmission zones and a second surface energy, different from the first surface energy, in the first zone, the first surface energy being an energy favouring wetting by the bubble with regard to the ambient phase, and the second surface energy being an energy favouring wetting by the ambient phase with regard to the bubble.

10. The device according to claim 6, wherein the respective viscosities of the ambient phase and the bubble are adjusted to enable a displacement of the bubble of fluid from one transmission zone to the other in a time less than 5 seconds, or 3 seconds, for a voltage between 5V and 20V.

11. The device according to claim 6, wherein the first fluid is an ionic hydrophilic fluid, whereas the second fluid comprises a hydrophobic fluid.

12. The device according to claim 2, wherein the functional fluid is a bistable fluid which is either opaque or reflective and/or diffusive to the radiation capable of being emitted by the light emission source, and which becomes transparent to said radiation when it is subjected to an electric field.

13. The device according to claim 12, wherein the bistable fluid comprises a nematic type liquid crystal, and more particularly a liquid crystal selected from: MLC-1380000, MLC-1390000, MLC-2139, MLC-2062 or E7.

14. The device according to claim 1, wherein the cover comprises a polymer material selected from: PMMA, PET, polycarbonate, silicone.

15. The device according to claim 1, wherein the light emission source comprises at least one light-emitting diode.

* * * * *